United States Patent [19]

Short

[11] Patent Number: 5,068,896
[45] Date of Patent: Nov. 26, 1991

[54] AUDIBLE NOISE REDUCING

[75] Inventor: William R. Short, Ashland, Mass.

[73] Assignee: Bose Corporation, Framingham, Mass.

[21] Appl. No.: 584,521

[22] Filed: Sep. 18, 1990

Related U.S. Application Data

[63] Continuation of Ser. No. 405,359, Sep. 11, 1989.

[51] Int. Cl.[5] ............................................. H04H 5/00
[52] U.S. Cl. ..................................................... 381/13
[58] Field of Search ................................ 381/4, 13, 10

[56] References Cited

U.S. PATENT DOCUMENTS

| | | | |
|---|---|---|---|
| 4,063,042 | 12/1977 | Mallon | 381/4 |
| 4,093,824 | 6/1978 | Grosjean | 381/4 |
| 4,208,547 | 6/1980 | Simeau | 381/13 |
| 4,704,726 | 11/1987 | Gibson | 381/13 |
| 4,748,669 | 5/1988 | Klayman | 381/1 |
| 4,761,814 | 8/1988 | Sugai et al. | 381/13 |

Primary Examiner—Forester W. Isen
Attorney, Agent, or Firm—Fish & Richardson

[57] ABSTRACT

A system for reducing audible noise in a stereo receiver includes a stereo demodulator having a monophonic signal output and a difference signal output. There is a left signal combiner and a right signal combiner. At least one filter having a controllable variable cutoff frequency intercouples at least one of the difference signal output and the monophonic signal output with the left and right combiners. A control signal generator has a control signal output coupled to the control signal input of the variable cutoff frequency filter.

31 Claims, 7 Drawing Sheets

MONO CHANNEL ALL PASS FILTER

Fig. 6

DIFFERENCE CHANNEL LOW PASS FILTER

CONTROL VOLTAGE GENERATOR

Fig. 4

SUM AND DIFFERENCE STAGES

AUDIBLE NOISE REDUCING

This application is a continuing application of application Ser. No. 07/405,359 filed Sept. 11, 1989.

The present invention relates in general to audible noise reducing in stereo broadcasts characterized by improved audible noise reduction not only in weak signal areas, but also under strong signal conditions, such as occur in the presence of multipath transmission without reducing stereo separation to the extent that occurs with conventional blending circuits.

In conventional FM stereo broadcasting the sum of left and right audio signals modulate the main carrier signal to provide a compatible monophonic audio signal. The difference between the left and right audio signals modulates a 38 kHz subcarrier to create a double sideband suppressed carrier signal that also modulates the carrier along with a 19 kHz pilot carrier used in the receiver to detect the different signal.

In the receiver the sum of the monophonic signal and the difference signal provide the left signal and the difference provides the right signal.

Noise added to the RF signal during transmission and in the receiver causes added noise at the FM detector output of the receiver with a spectrum that rises with frequency. Thus, the low frequency (under 15 kHz) monophonic signal is much less affected by noise than the high frequency (23-53 kHz) difference signal channel. Therefore, noise in the difference channel produces most of the audible noise at the output of a stereo receiver.

Typical FM stereo receivers, especially those used in mobile applications, include a blend circuit that reduces the level of the difference channel audio signal as audible noise increases. Although this circuitry reduces audible noise, it also reduces stereo separation. Typically this circuitry reduces gain in the different signal channel as received RF level decreases. Above a certain RF level, the difference channel gain does not change. Below that RF level, the difference signal channel gain decreases to reduce the audible noise. Below a still lower RF level, the difference signal channel gain is zero, resulting in monophonic reproduction of the stereo broadcast. Thus, the perceived audible noise level remains substantially constant during this transmission. However, stereo separation regressively decreases. Other criteria for controlling the gain of the difference signal channel may also be used. It is recognized that out-of-band noise; that is, noise at the FM detector output having spectral components above 100 kHz, is a good indicator of multipath conditions. A paper entitled "A Theoretical and Experimental Study of Noise and Distortion in the Reception of FM Signals" by Amar G. Bose and William L. Short, MIT Research Laborabory of Electronics Technical Report No. 540, demonstrates that multipath transmission causes greater noise and distortion in the higher frequency difference signal channel than in the audio monophonic channel. Thus, reducing gain in the difference signal channel upon sensing an increase in out-of-band noise may reduce the audible effect of multipath transmission, but at the expense of reduced stereo separation. Furthermore, the system may transmit noise that is audible because there is no audio signal of sufficient intensity to mask the noise.

According to the invention, the detected difference signal is applied to a low pass filter, and the output of the low pass filter is combined with the monophonic or sum signal to provide the left and right signals. The cutoff frequency of the low pass filter is adjusted dynamically to reject the noise spectral components above the cutoff frequency present in the detected difference frequency while allowing spectral components below the cutoff frequency to be combined with the sum signal and maintain good stereo separation while significantly reducing audible noise.

The cutoff frequency of the low pass filter may be adjusted in accordance with one or more parameters to provide a cutoff frequency control signal applied to the low pass filter to control the cutoff frequency. According to one aspect of the invention cutoff frequency may be set in accordance with the detected level of the RF signal by reducing the cutoff frequency with decreasing RF level.

According to another aspect of the invention, the cutoff frequency may be varied in accordance with the audio spectral components then being broadcast to take advantage of the psychoacoustic phenomenon of masking. When an audio signal spectral component is present at higher level than a corresponding noise spectral component, the audio signal masks the noise component, making it inaudible. By controlling the cutoff frequency to the highest frequency at which the audio signal spectral components exceed the levels of noise spectral components, the noise will not be audible. This approach results in considerably higher noise levels present without the noise being audible. The level of audio signal spectral components may be sensed in the monophonic signal channel or the difference signal channel, or combinations thereof. Sensing in the difference channel is preferable.

According to still another aspect of the invention, the cutoff frequency may be varied in accordance with the level of multipath interference, for example by reducing the cutoff frequency with increasing level of out-of-band noise spectral components.

According to another aspect of the invention, it is advantageous to include an all-pass filter in the monophonic channel with a cutoff frequency corresponding to that of the low pass filter of order and Q the same as that of the low pass filter so that the phase shift introduced by both filters is the same at all audio frequencies to attain reduction of audible noise while maintaining good stereo separation.

The invention has a number of advantages. It reduces audible noise under strong signal conditions and without reducing stereo separation for spectral components within the passband.

Numerous other features and advantages of the invention will become apparent from the following specification when read in connection with the accompanying drawing in which:

Figure 1:
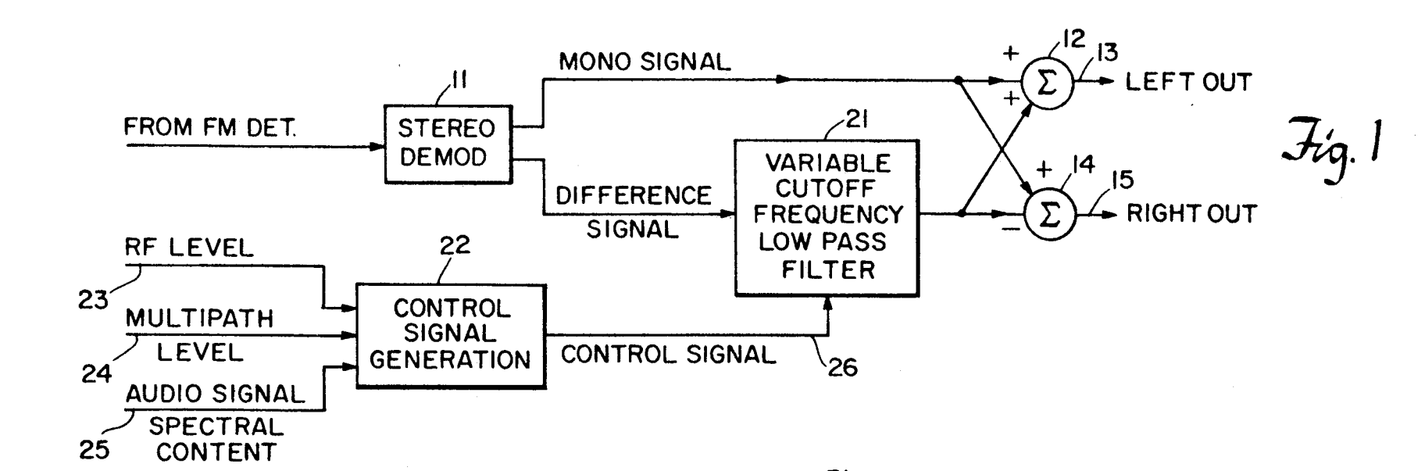
FIG. 1 is a block diagram illustrating the logical arrangement of an embodiment of the invention having a low pass filter with variable cutoff frequency in the difference signal channel.

With reference now to the drawing and more particularly FIG. 1 thereof, there is shown a block diagram illustrating the logical arrangement of an embodiment of the invention. The invention includes a conventional stereo demodulator 11, a left combiner 12 that adds the monophonic signal and difference signal to provide the left output signal on line 13 and a right combiner 14 that subtracts the difference signal from the monophonic signal to provide the right output signal on line 15. In addition the invention includes a variable cutoff frequency low pass filter 21 intercoupling the difference signal output of stereo demodulator 11 and left and right combiners 12 and 14. Alternatively, but less preferable, filter 21 could be a high cut shelf filter that may pass spectral components above cutoff, but with significant attenuation. A control signal generator 22 responds to an RF level signal on line 23, a multipath level signal on line 24 and an audio signal spectral content signal on line 25 to provide a control signal on line 26 that is applied to variable cutoff frequency low pass filter 21 to cause the cutoff frequency to decrease with decreasing RF level, increasing multipath level and decreasing audio signal spectral content.

Figure 2:
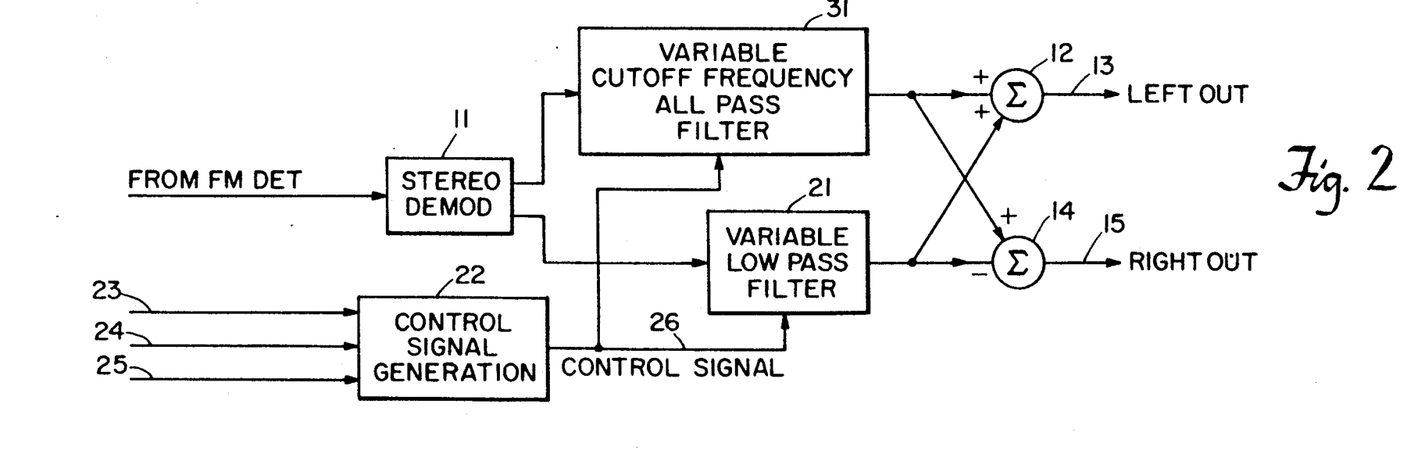
FIG. 2 is a variation of the embodiment of FIG. 1 also including an all-pass filter in the monophonic channel having a variable cutoff frequency.

Referring to FIG. 2, there is shown a variation of the embodiment of FIG. 2 in which variable cutoff frequency all-pass filter 31 is connected between the monophonic signal output of stereo demodulator 11 and left and right combiners 2 and 14. Control signal generator 22 controls the cutoff frequencies of all-pass filter 31 and low pass filter 21 to be the same, and both filters are characterized by the same Q and order so that the phase shift introduced by both filters to transmitted spectral components is substantially the same to maintain good stereo separation for the transmitted spectral components.

Figure 3:
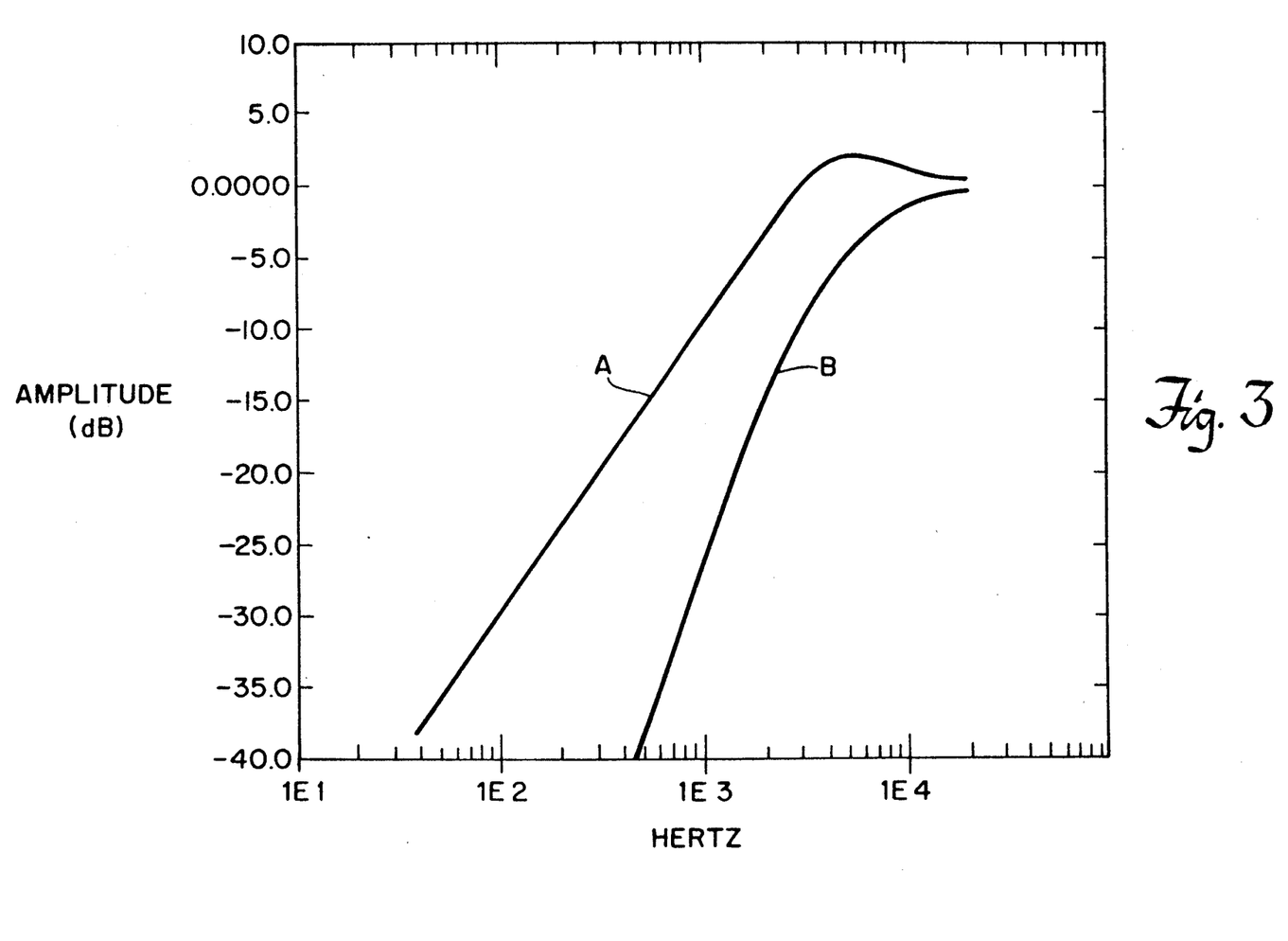
FIG. 3 is a graphical representation of stereo separation as a function of frequency for a given control voltage for the systems of FIGS. 1 and 2.

Referring to FIG. 3, there is shown a graphical representation of stereo separation as a function of frequency for a given control voltage by upper curve A and lower curve B for the systems of FIGS. 1 and 2, respectively. This representation demonstrates the improved stereo separation available from the system of FIG. 2.

Figure 4:
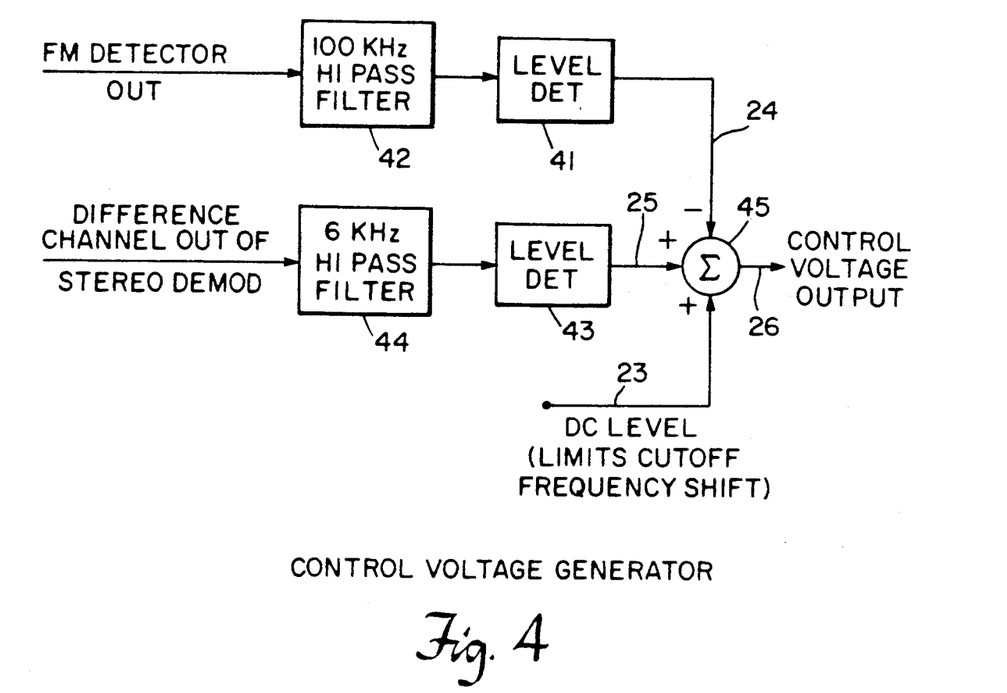
FIG. 4 is a block diagram illustrating the logical arrangement of a control signal generator responsive to the out-of-band noise level and the audio spectral content of the detected different signal.

Referring to FIG. 4, there is shown a block diagram illustrating the logical arrangement of a suitable embodiment for control signal generator 22. The multipath level signal on line 24 is at the output of level detector 41 that provides a signal representative of the out-of-band spectral components provided by the FM detector output after transmission through 100 kHz high pass filter 42 having a cutoff frequency at substantially 100 kHz. The DC level on line 23 may correspond to the AGC signal that is representative of RF level. The audio signal spectral content signal on line 25 may be on the output of level detector 43 representative of the difference signal spectral components above 6 kHz after transmission through high pass filter 44 having a cutoff frequency of .6 kHz. Combiner 45 combines these three signals as indicated to provide the control signal on line 26 that increases with increasing RF-level, increasing the spectral components in the difference signal above 6 kHz and decreasing out-of-band spectral components on line 24 to correspondingly increase the filter cutoff frequencies.

Figure 5:
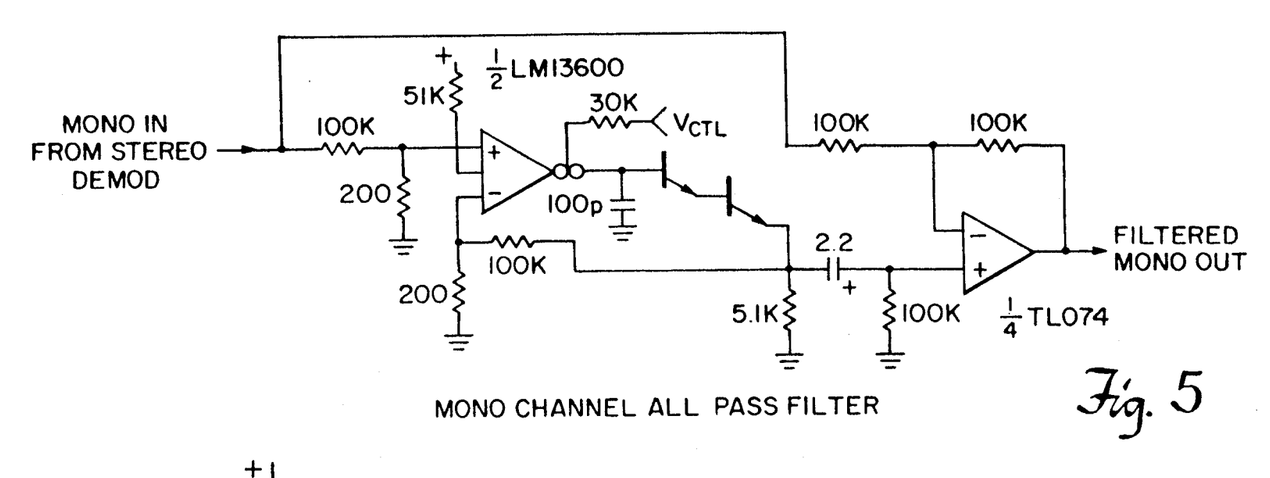
FIG. 5 is a schematic circuit diagram of an exemplary all-pass filter with controlled cutoff frequency.

Referring to FIG. 5, there is shown a schematic circuit diagram of an exemplary embodiment of the all-pass filter for the all-pass filter with controlled cutoff frequency.

Figure 6:
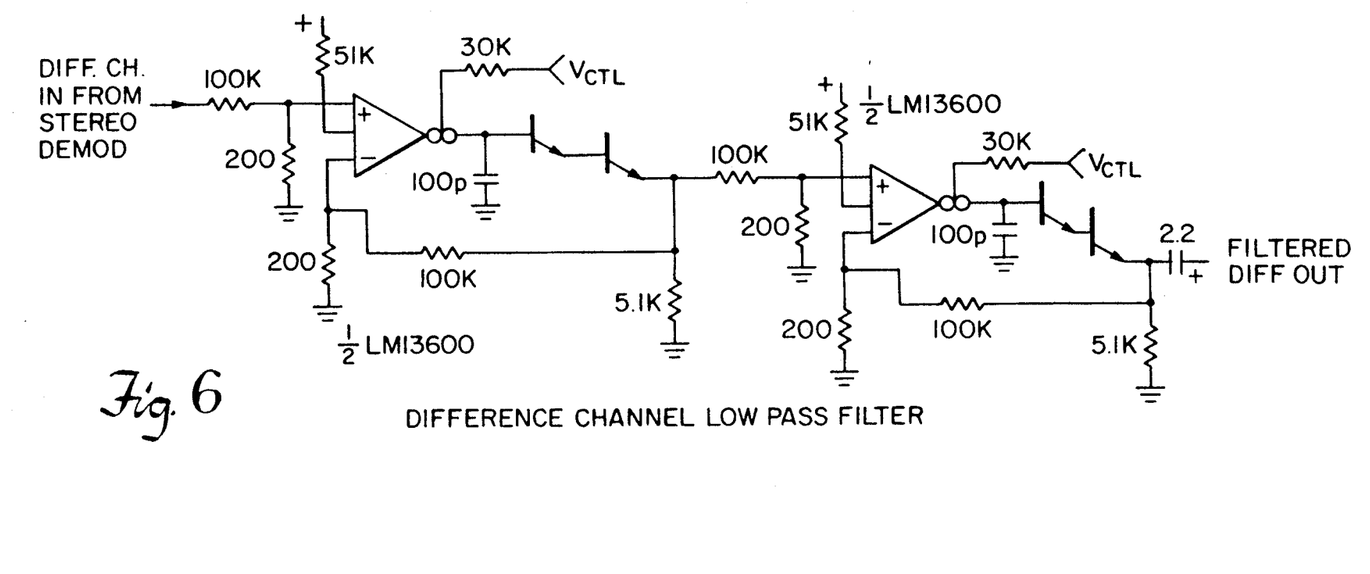
FIG. 6 is a schematic circuit diagram of an exemplary low-pass filter with controlled cutoff frequency.

Referring to FIG. 6, there is shown a schematic circuit diagram of an exemplary embodiment of the difference channel low-pass filter.

Figure 7:
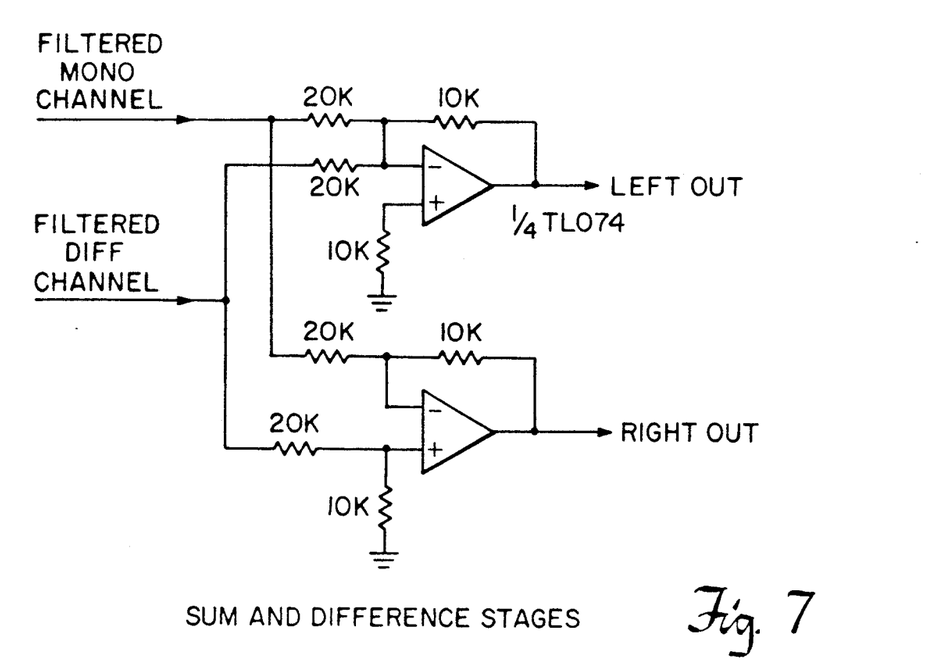
FIG. 7 is a schematic circuit diagram of an exemplary combiner.

Referring to FIG. 7, there is shown a schematic circuit diagram of an exemplary embodiment of combiners 12 and 14.

Figure 8:
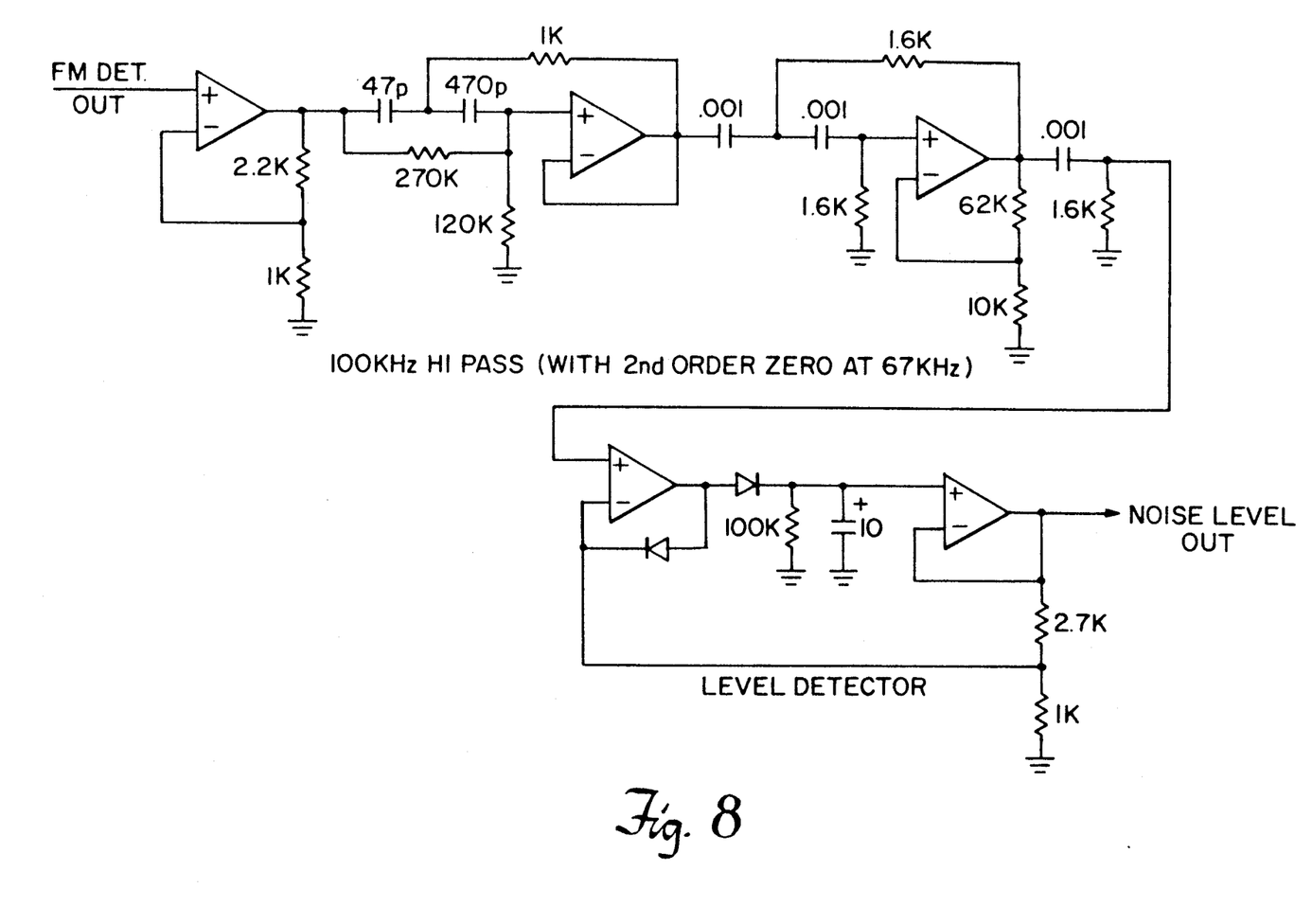
FIG. 8 is a schematic circuit digram of an exemplary 100 kHz, high pass filter and level detector.

Referring to FIG. 8, there is shown a schematic circuit diagram of an exemplary embodiment of 100 kHz high pass filter 42 and level detector 41.

Figure 9:
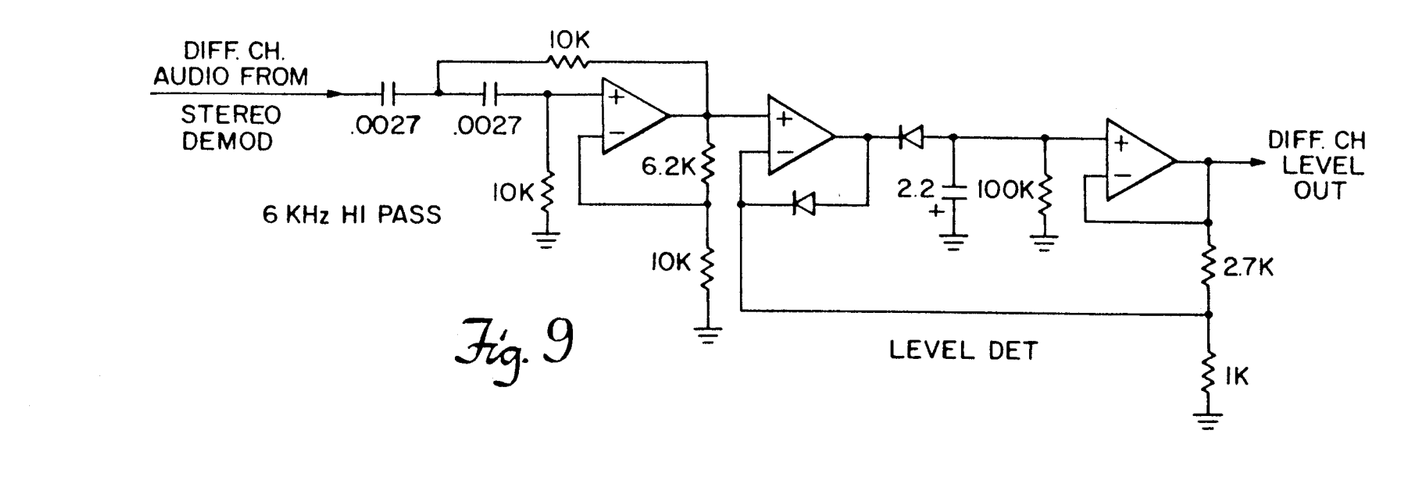
FIG. 9 is a schematic circuit diagram of a 6 kHz high-pass filter level detector.

Referring to FIG. 9, there is shown a schematic circuit diagram of 6 kHz high-pass filter 44 and level detector 43 of FIG. 4.

Figure 10:
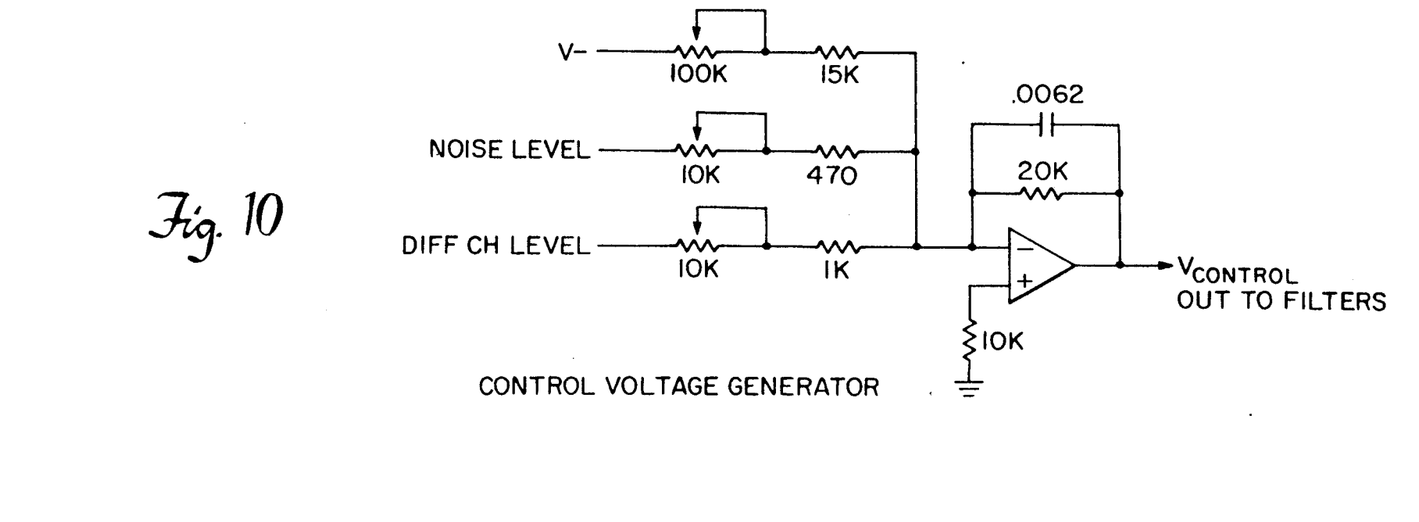
FIG. 10 is a schematic circuit diagram of an exemplary combiner of FIG. 4.

Referring to FIG. 10, there is shown a schematic circuit diagram of an exemplary embodiment of combiner 45 of FIG. 4.

Figure 11:
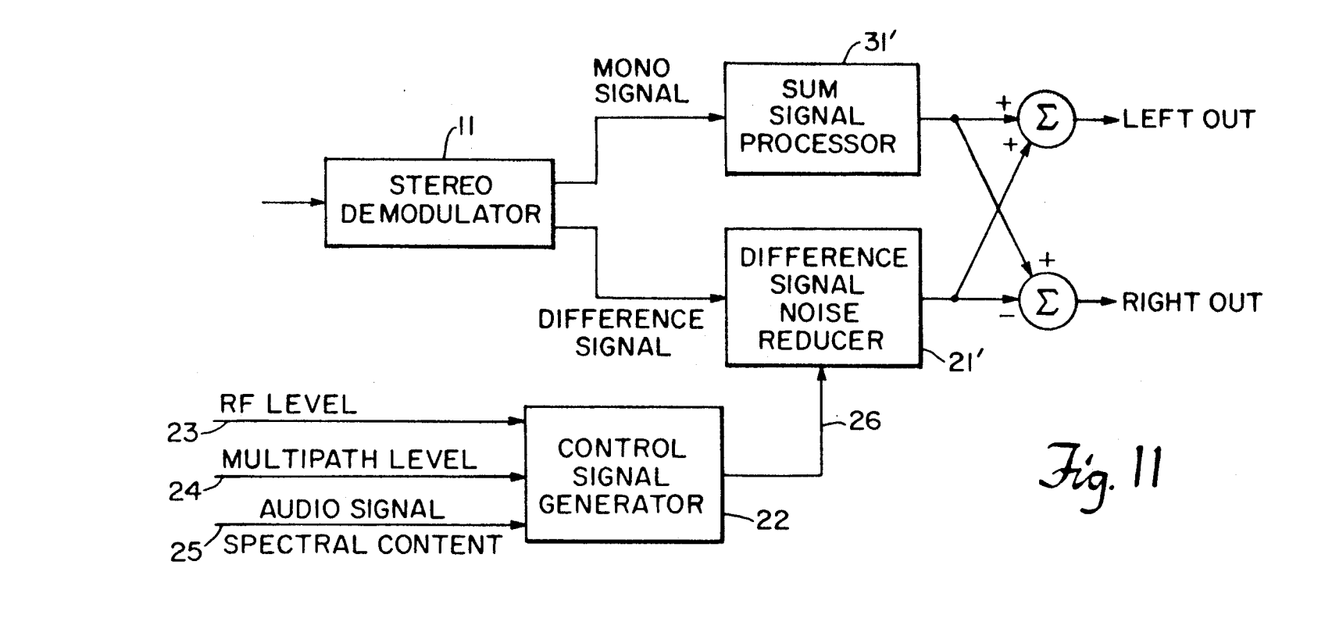
FIG. 11 is a block diagram illustrating the logical arrangement of a general system according to the invention.

Referring to FIG. 11, there is shown a block diagram illustrating the logical arrangement of a general system embodying the principals of the invention. This embodiment corresponds substantially to the embodiment of FIG. 2 except that difference signal processor 21' has been substituted for variable low pass filter 21 and sum signal processor 31' has been substituted for variable cutoff frequency all pass filter 31.

An important aspect of the invention is effecting noise reduction only in the difference signal channel, with only a related compensation if desired, which doesn't affect audible content in the sum channel. The level of noise reduction may be controlled with control signal 26 from control signal generator 22 in accordance with one or more of the signals on lines 23, 24 and 25. This aspect of the invention takes advantage of the recognition that under poor reception conditions, such as multi-channel degradation, the difference channel is most affected by degradation causing noise and distortion, while the sum channel remains relatively free of audible degradation.

Figure 12:
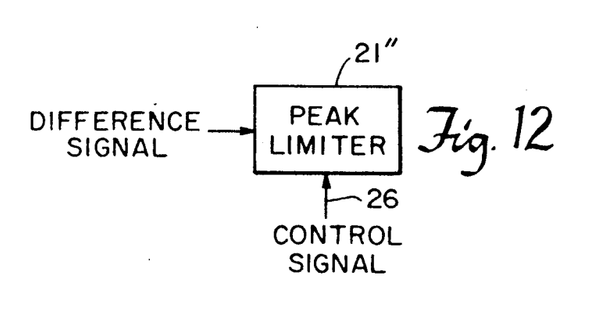
FIGS. 12 and 13 show peak limiter and noise gate embodiments of the difference signal noise reducer of FIG. 11, respectively.

A variable cutoff frequency low pass filter is one approach for the difference signal noise reducer. Other types of noise reducers may operate upon the difference signal. For example, difference signal noise reducer 21' may comprise peak clipper 21'' shown in FIG. 12. Preferably peak clipper 21'' hard limits the difference signal when the deference signal exceeds slightly more than 100% modulation. Peak clipper 21'' would then greatly reduce the effects of spikes in the difference signal introduced by multipath transmission. Peak clipper 22'' could be arranged to be operative continuously or only when the control signal on line 26 indicated the detection of multipath degradation.

Figure 13:
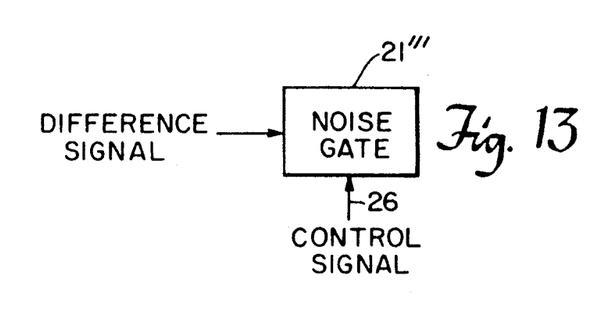

Another difference signal noise reducer may comprise noise gate 21''', which allows signals having a level above a threshold level to pass unchanged, while blocking signals, such as noise below the threshold level. Noise gate 21''' may be rendered operative continuously or in response to a control signal on line 26 indicate the presence of multipath degradation.

There has been described novel apparatus and techniques for reducing noise with a lesser reduction of stereo separation.

Other embodiments are within the claims.

What is claimed is:

1. Apparatus for reducing audible noise in a stereo receiver comprising,
    a stereo demodulator having a monophonic signal output and a difference signal output,
    a left signal combiner and a right signal combiner,
    a variable cutoff frequency filter with a control signal input and having a controllable variable cutoff frequency intercoupling said difference signal output with the left and right combiners,
    a control signal generator having a control signal output coupled to the control signal input of the variable cutoff frequency filter
    said control signal generator having at least one of an rf level input and a multipath level input and producing a bandwidth-reducing control signal on said control signal output when a signal on said at least one input indicates the rf signal then being received by said stereo receiver produces high frequency noise at said difference signal output to then reduce the bandwidth of said variable cutoff frequency filter and reduce the high frequency noise signal therefrom.

2. Noise reducing apparatus in accordance with claim 1 wherein said control signal generator has at least one input from the group consisting of said input for receiving a signal related to radio frequency level of the signal received by said stereo receiver, said input for receiving a signal relates to multipath level characterizing the degree of multipath components in the RF signal received by said stereo receiver, and an input for receiving a signal related to audio signal spectral content in a signal applied to said stereo demodulator,
    whereby said control signal on said control signal output is related to the signal then on said at least one input.

3. Noise reducing apparatus in accordance with claim 1 and further comprising,
    a second filter intercoupling the monophonic signal output with the left and right combiners and having a control signal input coupled to the control signal output of the control signal generator.

4. Noise reducing apparatus in accordance with claim 3 wherein both said filters impart substantially the same phase shift to audio spectral components transmitted therethrough.

5. Noise reducing apparatus in accordance with claim 1, further comprising an FM detector, wherein said control signal generator comprises at least one high pass filter with an input and an output and at least one level detector having an input coupled to the associated high pass filter output and an output coupled to said control signal output,
    each high pass filter input coupled to one of said FM detector and said difference signal output.

6. Noise reducing apparatus in accordance with claim 5 wherein a first high pass filter has a cutoff frequency at an audio frequency above 1 kHz and sufficiently low to pass audible noise spectral components with its input coupled to said difference signal output.

7. Noise reducing apparatus in accordance with claim 1, further comprising an FM detector, wherein said control signal generator comprises at least one high pass filter with an input and an output and at least one level detector having an input coupled to the associated high pass filter output and an output coupled to said control signal output,
    each high pass filter input coupled to one of said FM detector and said difference signal output.

8. Noise reducing apparatus in accordance with claim 7 wherein a first high pass filter has a cutoff frequency at an audio frequency above 1 kHz and sufficiently low to pass audible noise spectral components with its input coupled to said difference signal output.

9. Noise reducing apparatus in accordance with claim 8 wherein a second high pass filter has a cutoff frequency at radio frequency sufficiently low to pass spectral components characteristic of multipath reception with its input coupled to said FM detector and further comprising,
    a combiner having at least first and second inputs coupled to the respective level detector outputs and an output forming said control signal output.

10. Noise reducing apparatus in accordance with claim 9 wherein said combiner also has a third input that receives a D.C. level limiting the control signal on the control voltage output so that the cutoff frequency of the variable frequency filter remains above a predetermined audio frequency.

11. Noise reducing apparatus for reducing audible noise in a stereo receiver comprising,
    an FM detector,
    a stereo demodulator coupled to said FM detector having a monophonic signal output and a difference signal output,
    a left signal combiner and a right signal combiner,
    a variable cutoff frequency filter with a control signal input and having a controllable variable cutoff frequency intercoupling the difference signal output with the left and right combiners,
    and a control signal generator having a control signal output coupled to the control signal input of the variable cutoff frequency filter,
    wherein said control signal generator comprises at least first and second filters, each with an input and an output and corresponding level detectors having inputs coupled to the associated filter outputs and respective outputs coupled to said control signal output,
    said first filter input coupled to said difference signal output,
    wherein said first filter has a cutoff frequency at an audio frequency above 1 kHz and sufficiently low to pass audible noise spectral components,
    wherein said second filter comprises a multipath filter which has a radio frequency transmission characteristic sufficient to pass spectral components characteristic of multipath reception with its input coupled to said FM detector.

12. Noise reducing apparatus according to claim 11, further comprising,
    a multipath filter having a radio frequency transmission characteristic sufficient to pass spectral components characteristic of multipath reception with its input coupled to said monophonic signal output and further comprising, a combiner having at least first and second inputs coupled to the respective level detector outputs and an output forming said control signal output.

13. Noise reducing apparatus in accordance with claim 12 wherein said combiner also has a third input that receives a D.C. level limiting the control signal on the control voltage output so that the cutoff frequency of the variable frequency filter remains above a predetermined audio frequency.

14. Noise reducing apparatus for reducing audible noise in a stereo receiver comprising, a stereo demodulator having a monophonic signal output and a difference signal output, a left signal combiner and a right signal combiner, a variable cutoff frequency filter with a control signal input and having a controllable variable cutoff frequency intercoupling the difference signal output with the left and right combiners, and a control signal generator having a control signal output coupled to the control signal input of the variable cutoff frequency filter, wherein said control signal generator has at least one input from the group consisting of an input for receiving a signal related to radio frequency level of a signal received by said stereo receiver, an input for receiving a signal related to multipath level characterizing the degree of multipath components in the RF signal received by said stereo receiver, and an input for receiving a signal related to audio signal spectral content in a signal applied to said stereo demodulator, whereby said control signal on said control signal output is related to the signal then on said at least one input, wherein there are respective inputs for said r-f level, said multipath level and said audio signal spectral content.

15. Noise reducing apparatus for reducing audible noise in a stereo receiver comprising, a stereo demodulator having a monophonic signal output and a difference signal output, a left signal combiner and a right signal combiner, a variable cutoff frequency filter with a control signal input and having a controllable low pass variable cutoff frequency intercoupling the difference signal output with the left and right combiners, a control signal generator having a control signal output coupled to the control signal input of the variable cutoff frequency filter, and a second filter intercoupling the monophonic signal output with the left and right combiners and having a control signal input coupled to the control signal output of the control signal generator, wherein both said filters impart substantially the same phase shift to audio spectral components transmitted therethrough, wherein said second filter is an all-pass filter within the audio frequency band.

16. Noise reducing apparatus for reducing audible noise in a stereo receiver comprising, a stereo demodulator having a monophonic signal output and a difference signal output, a left signal combiner and a right signal combiner, a variable cutoff frequency filter with a control signal input and having a controllable variable cutoff frequency intercoupling the difference signal output with the left and right combiners, and a control signal generator having a control signal output coupled to the control signal input of the variable cutoff frequency filter, wherein said receiver has an FM detector output and said control signal generator comprises, a first channel having a high pass filter with a superaudible cutoff frequency nd a level detector arranged to receive a signal from the FM detector output of said receiver representative of multipath to provide a multipath level signal representative of multipath level, a second channel having a high pass filter with a cutoff frequency in the treble audio frequency range and a level detector arranged to receive a difference signal from said difference signal output to provide an audio signal spectral content level signal representative of audio signal spectral content, and a combiner having at least first and second inputs for receiving said multipath level signal and said audio signal spectral content level signal to provide at least a component of said control signal related to the latter level signal.

17. Noise reducing apparatus in accordance with claim 16 wherein said combiner has at least a third input for receiving a D-C level that limits the range of variability of said cutoff frequency and forms a component of said control signal.

18. Noise reducing apparatus for reducing audible noise in a stereo receiver comprising, a stereo demodulator having a monophonic signal output and a difference signal output, a left signal combiner and a right signal combiner, a variable cutoff frequency filter with a control signal input and having a controllable variable cutoff frequency intercoupling the difference signal output with the left and right combiners, a control signal generator having a control signal output coupled to the control signal input of the variable cutoff frequency filter, wherein the variable cutoff frequency filter is a low pass or high cut filter intercoupling the difference signal output with the left and right signal combiners, and a second filter intercoupling the monophonic signal output with the left and right combiners and having a control signal input coupled to the control signal output of the control signal generator, wherein both said filters impart substantially the same phase shift to audio spectral components transmitted therethrough, wherein said low pass filter comprises, at least one inverting amplifier having an output coupled to an input thereof via at least one emitter follower circuit, said inverting amplifier output for receiving said control signal, wherein said second filter comprises an inverting amplifier having an input at its inverted output for receiving said control signal with its inverted output coupled to a second amplifier by an emitter follower circuit.

19. Noise reducing apparatus for reducing audible noise in a stereo receiver comprising, a stereo demodulator having a monophonic signal output and a difference signal output, a left signal combiner and a right signal combiner, a variable cutoff frequency filter with a control signal input and having a controllable low pass variable cutoff frequency intercoupling the difference signal output with the left and right combiners, a control signal generator having a control signal output coupled to the control signal input of the variable cutoff frequency filter, and a second filter intercoupling the monophonic signal output with the left and right combiners and having a control signal input coupled to the control signal output of the control signal generator, wherein both said filters impart substantially the same phase shift to audio spectral components transmitted therethrough, wherein said low pass filter comprises, at least one inverting amplifier having an output coupled to an input thereof via at least one emitter follower circuit, said inverting amplifier output receiving said control signal.

20. Apparatus for reducing audible noise in a stereo receiver comprising, a stereo demodulator having a monophonic signal output and a difference signal output, a left signal combiner and a right signal combiner, and a difference signal noise reducer intercoupling the difference signal output with the left and right combiners said difference signal noise reducer having at least one of an rf level input and a multipath level input that reduces the bandwidth of the transmission path between said difference signal output and said left and right signal combiners when a signal on said at least one input indicates the rf signal then being received by said stereo receiver produces high frequency noise at said difference signal output to reduce the high frequency noise transmitted over said transmission path to said left and right signal combiners.

21. Apparatus for reducing audible noise in accordance with claim 20 and further comprising, a sum signal processor intercoupling the monophonic signal output with the left and right signal combiners.

22. Noise reducing apparatus in accordance with claim 21 wherein said difference signal noise reducer comprises a noise gate.

23. Noise reducing apparatus in accordance with claim 21 wherein said difference signal noise reducer has a control signal input and further comprising, a control signal generator having a control signal output coupled to the control signal input of the difference signal noise reducer.

24. Noise reducing apparatus in accordance with claim 23 wherein said difference signal noise reducer comprises a peak limiter.

25. Noise reducing apparatus in accordance with claim 23 wherein said difference signal noise reducer comprises a noise gate.

26. Noise reducing apparatus in accordance with claim 21 wherein said difference signal noise reducer comprises a peak limiter.

27. Noise reducing apparatus in accordance with claim 20 wherein said difference signal noise reducer comprises a peak limiter.

28. Noise reducing apparatus in accordance with claim 20 wherein said difference signal noise reducer has a control signal input and further comprising, a control signal generator having a control signal output coupled to the control signal input of the difference signal noise reducer.

29. Noise reducing apparatus in accordance with claim 28 wherein said difference signal noise reducer comprises a peak limiter.

30. Noise reducing apparatus in accordance with claim 28 wherein said difference signal noise reducer comprises a noise gate.

31. Noise reducing apparatus in accordance with claim 20 wherein said difference signal noise reducer comprises a noise gate.

* * * * *